US009367844B1

(12) United States Patent
Hu et al.

(10) Patent No.: US 9,367,844 B1
(45) Date of Patent: Jun. 14, 2016

(54) METHOD AND SYSTEM FOR ONLINE AND PHYSICAL MERCHANT SPECIFIC FRAUD DETECTION SYSTEM

(71) Applicant: MasterCard International Incorporated, Purchase, NY (US)

(72) Inventors: Po Hu, Norwalk, CT (US); Tong Zhang, Greenwich, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/667,865

(22) Filed: Mar. 25, 2015

(51) Int. Cl.
*G06K 5/00* (2006.01)
*G06Q 20/40* (2012.01)

(52) U.S. Cl.
CPC .................................. *G06Q 20/4016* (2013.01)

(58) Field of Classification Search
CPC ... G06Q 20/40; G06Q 20/4016; G06Q 20/10; G06Q 20/20; G06Q 20/403; G06Q 20/04; G06Q 20/042; G06Q 20/102; G06Q 20/1085; G06Q 20/204; G06Q 20/322; G06Q 20/401; G06Q 20/40145; G06Q 20/405
USPC .................. 235/380, 375, 492, 382
See application file for complete search history.

(56) References Cited

U.S. PATENT DOCUMENTS

| 5,679,940 | A | * | 10/1997 | Templeton | G06Q 20/04 235/375 |
| 2005/0133588 | A1 | * | 6/2005 | Williams | G06Q 20/20 235/379 |
| 2007/0138257 | A1 | * | 6/2007 | Dragt | G06Q 20/10 235/379 |
| 2008/0207327 | A1 | * | 8/2008 | Van Luchene | A63F 13/12 463/42 |
| 2011/0238510 | A1 | * | 9/2011 | Rowen | G06K 9/00187 705/16 |
| 2013/0282578 | A1 | * | 10/2013 | Ma | G06Q 20/40 705/44 |
| 2014/0344155 | A1 | * | 11/2014 | Liu | G06Q 20/4016 705/44 |

* cited by examiner

*Primary Examiner* — Thien M Le
(74) *Attorney, Agent, or Firm* — Buchanan Ingersoll & Rooney PC

(57) ABSTRACT

A method for processing payment transactions with merchant-specific fraud detection includes: storing a merchant profile, the profile including data related to a merchant including a merchant identifier and a plurality of transaction data entries, each entry including data related to a payment transaction involving the merchant including transaction data; receiving an authorization request for a payment transaction, the request including the merchant identifier and transaction data; calculating a fraud score for the payment transaction based on application of one or more scoring algorithms to the transaction data included in the authorization request and based on the transaction data included in transaction data entries in the merchant profile; transmitting the transaction data included in the received authorization request and the calculated fraud score to the merchant; and receiving a notification from the merchant indicating acceptance of risk for the payment transaction.

16 Claims, 7 Drawing Sheets

METHOD AND SYSTEM FOR ONLINE AND PHYSICAL MERCHANT SPECIFIC FRAUD DETECTION SYSTEM

FIELD

The present disclosure relates to the processing of payment transactions using a merchant-specific fraud detection system, specifically using a merchant's transaction history to provide for a merchant specific fraud score that may be used by the merchant to accept the risk of a payment transaction to reduce merchant losses due to fraud and false positives.

BACKGROUND

In many traditional payment systems, when a credit card or other type of payment card is used, a payment network will calculate a fraud score for the transaction based on transaction details and account data for the credit card account, and deliver the fraud score to an issuing bank that holds the account. The issuer is then free to decide to approve or decline the transaction based on the fraud score among other deciding factors, such as the amount of available credit for the account. If the issuer decides to decline the transaction, then the merchant may be notified and the transaction may be stopped unless the consumer presents an alternative payment method.

However, these existing fraud detection systems often rely on historical transaction data across a vast number of consumers and merchants in order to develop the algorithms and rules that are applied to transactions. The result is that the same algorithms are applied to transactions at a small, specialty business as they are at an international department store chain and designed based on data captured thereto. Because the transactions, consumers, products, and considerations for each merchant can vary greatly from merchant to merchant, using such broadly designed and applied fraud rules can be detrimental, leading to instances where fraud is not detected or a genuine transaction incorrectly identified as fraudulent. This can result in a loss of revenue for the merchants, acquirers, and issuers involved, and can also greatly convenience consumers in instances where a genuine transaction is indicated as fraudulent, which may adversely affect the ongoing consumer-merchant relationship.

Thus, there is a need for a technical system where fraud detection is based on merchant specific data. By generating fraud rules and algorithms that are specific to a merchant, more accurate fraud scores can be obtained, which can result in more effective fraud detection. In addition, by enabling merchants to accept the risk of a transaction based on the merchant specific fraud detection data, some merchants may be able to reduce the occurrence of false positive transactions being rejected, further increasing the effectiveness of the system and thereby increasing overall revenue for all parties involved and increasing the strength of the consumer-merchant relationship.

SUMMARY

The present disclosure provides a description of systems and methods for processing payment transactions using merchant specific fraud detection.

A method for processing payment transactions with merchant-specific fraud detection includes: storing, in a merchant database, a merchant profile, wherein the merchant profile includes data related to a merchant including at least a merchant identifier and a plurality of transaction data entries, each transaction data entry including data related to a payment transaction involving the related merchant including at least transaction data; receiving, by a receiving device, an authorization request for a payment transaction, wherein the authorization request includes at least the merchant identifier and transaction data; calculating, by a processing device, a fraud score for the payment transaction based on application of one or more scoring algorithms to at least the transaction data included in the received authorization request and based on at least the transaction data included in one or more transaction data entries included in the merchant profile; transmitting, by a transmitting device, at least the transaction data included in the received authorization request and the calculated fraud score to the related merchant; and receiving, by the receiving device, a notification from the related merchant indicating acceptance of risk for the payment transaction.

A system for processing payment transactions with merchant-specific fraud detection includes a merchant database, a receiving device, a processing device, and a transmitting device. The merchant database is configured to store a merchant profile, wherein the merchant profile includes data related to a merchant including at least a merchant identifier and a plurality of transaction data entries, each transaction data entry including data related to a payment transaction involving the related merchant including at least transaction data. The receiving device is configured to receive an authorization request for a payment transaction, wherein the authorization request includes at least the merchant identifier and transaction data. The processing device is configured to calculate a fraud score for the payment transaction based on application of one or more scoring algorithms to at least the transaction data included in the received authorization request and based on at least the transaction data included in one or more transaction data entries included in the merchant profile. The transmitting device is configured to transmit at least the transaction data included in the received authorization request and the calculated fraud score to the related merchant. The receiving device is further configured to receive a notification from the related merchant indicating acceptance of risk for the payment transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

System for Merchant Specific Fraud Detection

Figure 1:
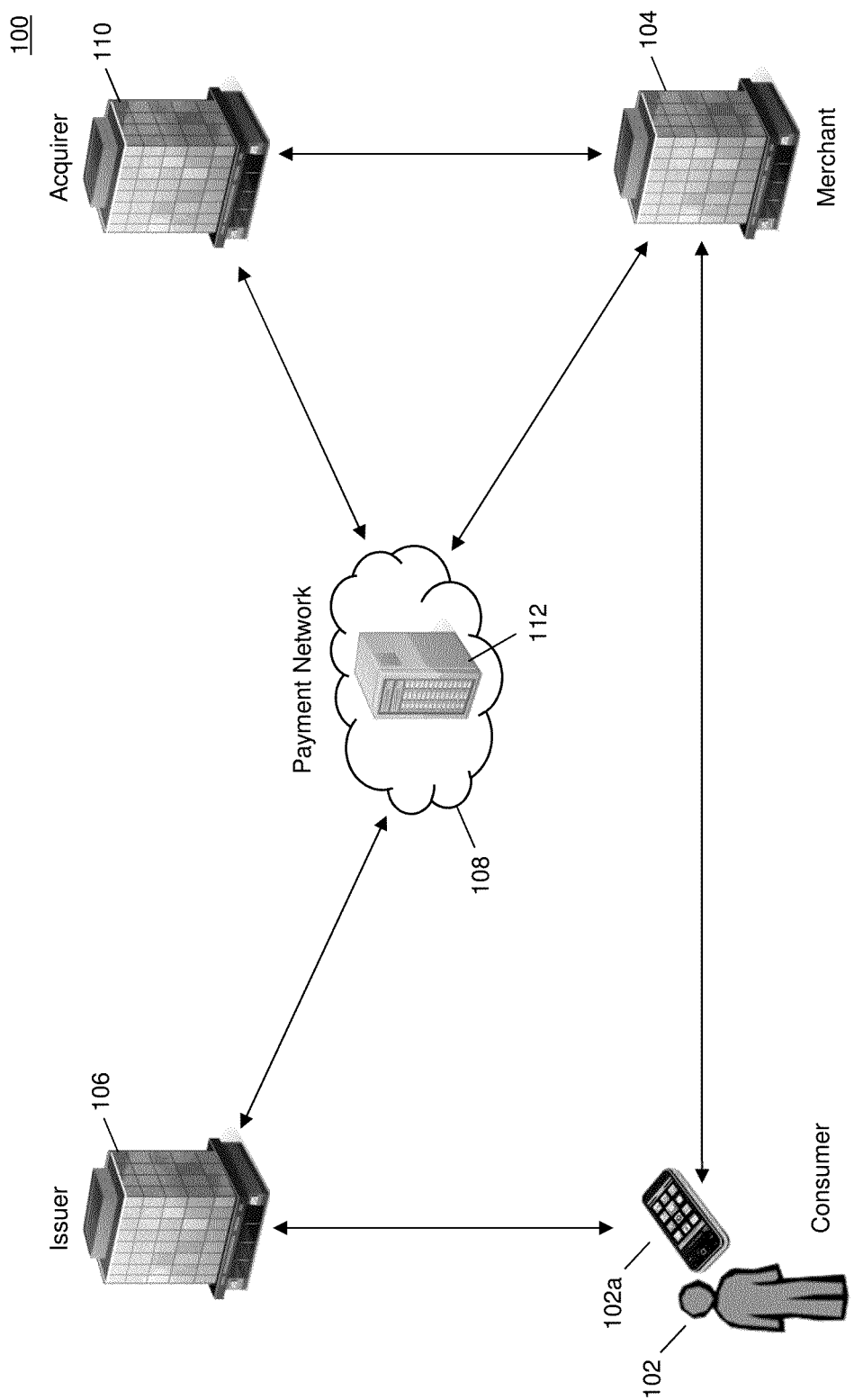
FIG. 1 is a block diagram illustrating a high level system architecture for processing transactions using merchant specific fraud detection systems in accordance with exemplary embodiments.

FIG. 1 illustrates a system 100 for the processing of payment transactions utilizing a merchant specific fraud detection system and subsequent merchant acceptance of risk.

In the system 100, a consumer 102 may conduct a payment transaction with a merchant 104, meaning the computer system of a merchant, via a computer device 102a (mobile phone, tablet, desktop, wearable or implanted or other computer capable of carrying out the functions identified herein) of the consumer 102. The payment transaction may be funded by a transaction account associated with the consumer 102 that is held by (e.g., administered by, issued by, or otherwise associated with) an issuer 106. The issuer 106 may be a computer system and distribution system of a financial institution, such as an issuing bank, or other suitable entity configured to issue transaction accounts to a consumer 102 for use in funding payment transactions. The transaction account may be, for instance, a credit card account, debit account, checking account, etc.

The payment transaction involving computer device 102a of the consumer 102 and merchant 104 may be processed by a payment network 108. In some embodiments, transaction data for the payment transaction may be first transmitted from the merchant 104 to an acquirer 110, meaning the computer system of an acquirer. The acquirer 110 may be the computer system of a financial institution, such as an acquiring bank, or other suitable entity configured to hold, administer, issue, or otherwise be associated with a transaction account associated with the merchant 104. The acquirer 110 may receive the transaction data from the merchant 104 and submit an authorization request to the payment network 108 for processing using traditional methods and systems that will be apparent to persons having skill in the relevant art. In some embodiments, the merchant 104 may submit an authorization request to the payment network 108 directly.

The payment network 108 may include a processing server 112. The processing server 112, discussed in more detail below, may be configured to calculate a fraud score for the payment transaction using a merchant specific fraud detection system. The fraud score may be calculated by the processing server 112 based on transaction data associated with the merchant 104 that is thereby merchant specific to the merchant 104. The transaction data may be captured by the processing server 112 and/or payment network 108 during the processing of payment transactions involving the merchant 104. In some embodiments, the processing server 112 and/or payment network 108 may develop one or more scoring algorithms that are specific to the merchant 104 based on the merchant's transaction history. The processing server 112 may calculate the fraud score for the payment transaction using the scoring algorithm(s) specific to the merchant 104, which may thereby be indicative of the likelihood of fraud in the payment transaction as applicable to the specific merchant 104.

In some embodiments, the processing server 112 may also use additional data associated with the merchant 104 in the development of the scoring algorithms for the merchant 104 and/or in the calculation of a fraud score for a payment transaction involving the merchant 104. The additional data may include, for instance, geographic location, business size, merchant industry, revenue, profit margin, or other suitable data associated with the merchant 104. In some instances, the fraud score may be calculated using the merchant specific scoring algorithm as applied to transaction data for the payment transaction, which may include the transaction amount, product data, point of sale data, payment method, transaction type, authentication method, etc.

In some embodiments, the processing server 112 may also be configured to use account data associated with the consumer 102 involved in the payment transaction in addition to the merchant specific data. For instance, the processing server 112 may use transaction history for the consumer 102 as captured by the payment network 108 and/or processing server 112. The processing server 112 may also use additional data associated with the consumer 102, such as issuer 106 data, demographic data associated with the consumer 102, account information for the transaction account used to fund the payment transaction (e.g., credit limit, account age, etc.), and other suitable data. In some instances, the processing server 112 may use transaction data for past payment transactions involving both the consumer 102 and the merchant 104.

Once the fraud score has been calculated for the payment transaction, the fraud score may be delivered to the issuer 106. The issuer 106 may then approve or deny the payment transaction based on the fraud score and any other suitable data, such as based on the availability of funds or credit in the transaction account used by the consumer 102 to fund the payment transaction. The issuer 106 may provide their approval or denial to the payment network 108 in the form of an authorization response, and the payment network 108 may process the payment transaction accordingly using traditional methods and systems.

In some embodiments, the merchant 104 may be able to accept the risk for a payment transaction based on the calculated fraud score. In such an embodiment, the processing server 112 may provide the calculated fraud score to the merchant 104. As discussed in more detail below, the calculated fraud score may be provided to the merchant 104 before the transaction data and fraud score are delivered to the issuer 106, or may be provided to the merchant 104 in instances where the issuer 106 has declined the payment transaction. In such instances, the merchant 104 may be provided with the opportunity to accept the risk of the payment transaction based on the calculated fraud score.

If the merchant 104 accepts the risk of the payment transaction, then, in some embodiments, the payment network 108 may process the payment transaction and if the transaction is determined to be fraudulent (e.g., disputed by an account holder), the merchant 104 may be liable for costs incurred as will be apparent to persons having skill in the relevant art. In other embodiments, the processing server 112 may notify the issuer 106 of the merchant's acceptance of the risk. In such an embodiment, the issuer 106 may decide to approve the payment transaction based on the merchant's acceptance of risk. In some instances, if the payment transaction is later found to be fraudulent, the merchant 104 may be held liable for any related costs or fees. In instances where the payment transaction is not found to be fraudulent, the acceptance of risk by the merchant 104 may enable the payment transaction to still be processed, which may increase goodwill between the consumer 102 and the merchant 104, as well as increase revenue via a transaction that may have been denied and not processed using traditional fraud detection systems.

The methods and systems discussed herein thereby enable the processing server 112 to provide merchant specific fraud scores in a merchant specific fraud detection system that can provide stronger, more effective fraud scores to both merchants 104 and issuers 106. By providing fraud scores that are specific to a merchant 104, the fraud scores calculated by the processing server 112 using the methods and systems discussed herein may provide for a more accurate assessment of the likelihood of fraud for a payment transaction as it is tailored to the individual merchant 104 and not affected by behavior of other merchants that may be in unrelated industries and have drastically different consumers, products, and merchant profiles. Furthermore, enabling the merchant 104 to accept the risk can result in an increase of successfully processed payment transactions that may have otherwise been denied, resulting in more revenue for merchants 104, issuers 106, payment networks 108, and acquirers 110, and increasing the strength of the relationship between the consumer 102 and the merchant 104. Therefore, the methods and systems discussed herein can provide a vast number of advantages over existing fraud detection systems via the use of merchant specific data in the development of fraud scoring algorithms and calculation of fraud scores.

Processing Server

Figure 2:
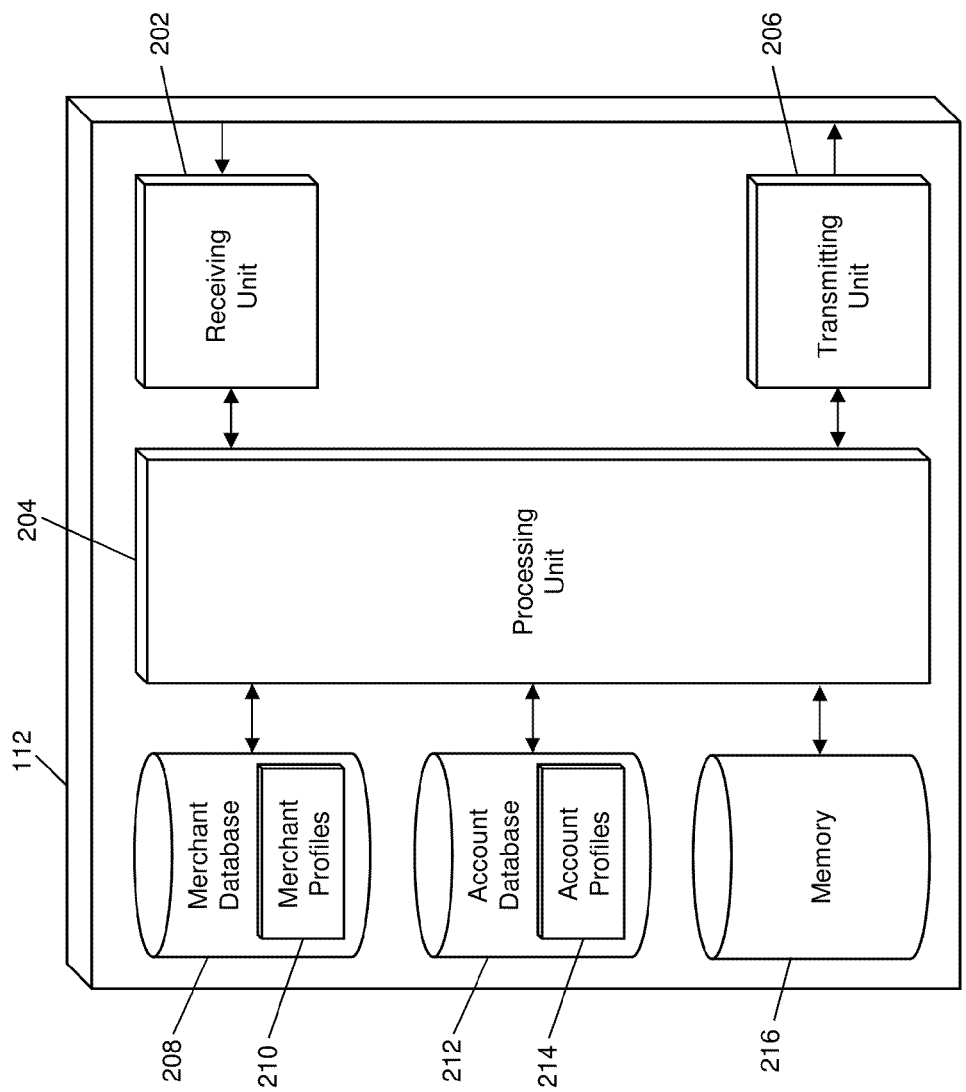
FIG. 2 is a block diagram illustrating the processing server of FIG. 1 for providing merchant specific fraud scores in accordance with exemplary embodiments.

FIG. 2 illustrates an embodiment of the processing server 112 of the system 100. It will be apparent to persons having skill in the relevant art that the embodiment of the processing server 112 illustrated in FIG. 2 is provided as illustration only and may not be exhaustive to all possible configurations of the processing server 112 suitable for performing the functions as discussed herein. For example, the computer system 700 illustrated in FIG. 7 and discussed in more detail below may be a suitable configuration of the processing server 112.

The processing server 112 may include a receiving unit 202. The receiving unit 202 may be configured to receive data over one or more networks via one or more network protocols. The receiving unit 202 may receive transaction data from the payment network 108 and/or from merchants 104 and acquirers 110, such as included in authorization requests for payment transactions. The receiving unit 202 may also receive merchant data associated with merchants 104 and merchant transaction accounts, as well as consumer data associated with consumers 102 and consumer transaction accounts, such as directly from merchants 104 and consumers 102, and from additional sources such as issuers 106, acquirers 110, data collection agencies, credit bureaus, etc.

The processing server 112 may also include a merchant database 208. The merchant database 208 may be configured to store a plurality of merchant profiles 210. Each merchant profile 210 may be configured to store data related to a merchant 104 including at least a merchant identifier and a plurality of transaction data entries. The merchant identifier may be a unique value suitable for the identification of the respective merchant profile 210 and/or related merchant 104, such as an identification number, transaction account number, tax identification number, device identifier, etc. The transaction data entries may each be related to a payment transaction involving the related merchant 104 and may include transaction data. The transaction data may include a transaction amount, geographic location, product data, merchant data, point of sale data, offer data, loyalty data, and any other data that may be used in the methods and systems discussed herein as will be apparent to persons having skill in the relevant art.

In some embodiments, the processing server 112 may further include an account database 212. The account database 212 may be configured to store a plurality of account profiles 214. Each account profile 214 may include data related to one or more transaction accounts, such as transaction accounts associated with a consumer 102 or other entity. Data included in account profiles 214 may include an account identifier and a plurality of transaction data entries. The account identifier may be a unique value used for the identification of the respective account profile 214 and/or related transaction accounts or entities, such as an identification number, transaction account number, tax identification number, device identifier, username, email address, phone number, loyalty number, etc. The transaction data entries may include data reacted to payment transactions involving the related transaction account(s).

The processing server 112 may also include a memory 216. The memory 216 may be configured to store data suitable for use in performing the functions of the processing server 112 as discussed herein. For example, the memory 216 may be configured to store scoring algorithms used in the calculation of fraud scores, transaction processing rules, communication protocol data, application program code, etc. Additional data stored in the memory 216 will be apparent to persons having skill in the relevant art. In some embodiments, the memory 216 may store merchant specific scoring algorithms associated with each merchant 104 for whom the processing server 112 calculates fraud scores. In other embodiments, each merchant profile 210 may include one or more scoring algorithms specific to the related merchant 104.

The processing server 112 may also include a processing unit 204. The processing unit 204 may be configured to perform the functions of the processing server 112 discussed herein as will be apparent to persons having skill in the relevant art. The processing unit 204 may be configured to calculate merchant specific fraud scores for payment transactions. In some embodiments, a merchant specific fraud score may be based on application of a fraud scoring algorithm to transaction data included in transaction data entries of a merchant profile 210 related to a merchant 104 involved in a payment transaction being scored. The merchant profile 210 may be identified via the inclusion of the included merchant identifier in an authorization request for the payment transaction being scored. In other embodiments, the merchant specific fraud score may be based on application of a merchant specific fraud scoring algorithm, generated based on the transaction data included in the merchant profile 210, to the transaction data included in the authorization request for the payment transaction being scored.

In some embodiments, the processing unit 204 may be configured to generate fraud scoring algorithms based on transaction data. For example, the processing unit 204 may generate a fraud scoring algorithm specific to a merchant 104 using data specific to that merchant 104, such as the transaction data included in the merchant profile 210 related to the merchant 104, and any other available data, such as merchant specific data that may be stored in the merchant profile 210 (e.g., geographic location, business size, merchant industry, etc.). The fraud scoring algorithm may be stored in the merchant profile 210 and/or the memory 216. In some instances, the fraud scoring algorithm may be applied to a single payment transaction to generate a fraud score. In other instances, the fraud scoring algorithm may be applied to the payment transaction and transaction history for the merchant 104 and/or consumer 102 involved in the payment transaction.

The processing server 112 may also include a transmitting unit 206. The transmitting unit 206 may be configured to transmit data over one or more networks via one or more network protocols. The transmitting unit 206 may transmit transaction data and calculated fraud scores to issuers 106, acquirers 110, and merchants 104. The transmitting unit 206 may also transmit authorization responses, such as responses received from the issuer 106 forwarded to the acquirer 110 and/or merchant 104 in the processing of a payment transaction. The transmitting unit 206 may also be configured to transmit merchant acceptances of risk, such as received by the receiving unit 202 and transmitted to the issuer 106 for use in determination by the issuer 106 and/or processing unit 204 in the approval or denial of a payment transaction.

It will be apparent to persons having skill in the relevant art that the processing server 112 may include additional components and/or that the components included in the processing server 112 as illustrated in FIG. 2 and discussed herein may be further configured to perform additional functions. For example, in embodiments where the processing server 112 may be configured to process payment transactions in the payment network 108, the components of the processing server 112 may be further configured to perform additional functions associated thereto, such as the generating of transaction messages, generation of application cryptograms, authentication of payment credentials, etc.

Processing Payment Transactions Using Merchant Specific Fraud Detection

Figure 3:
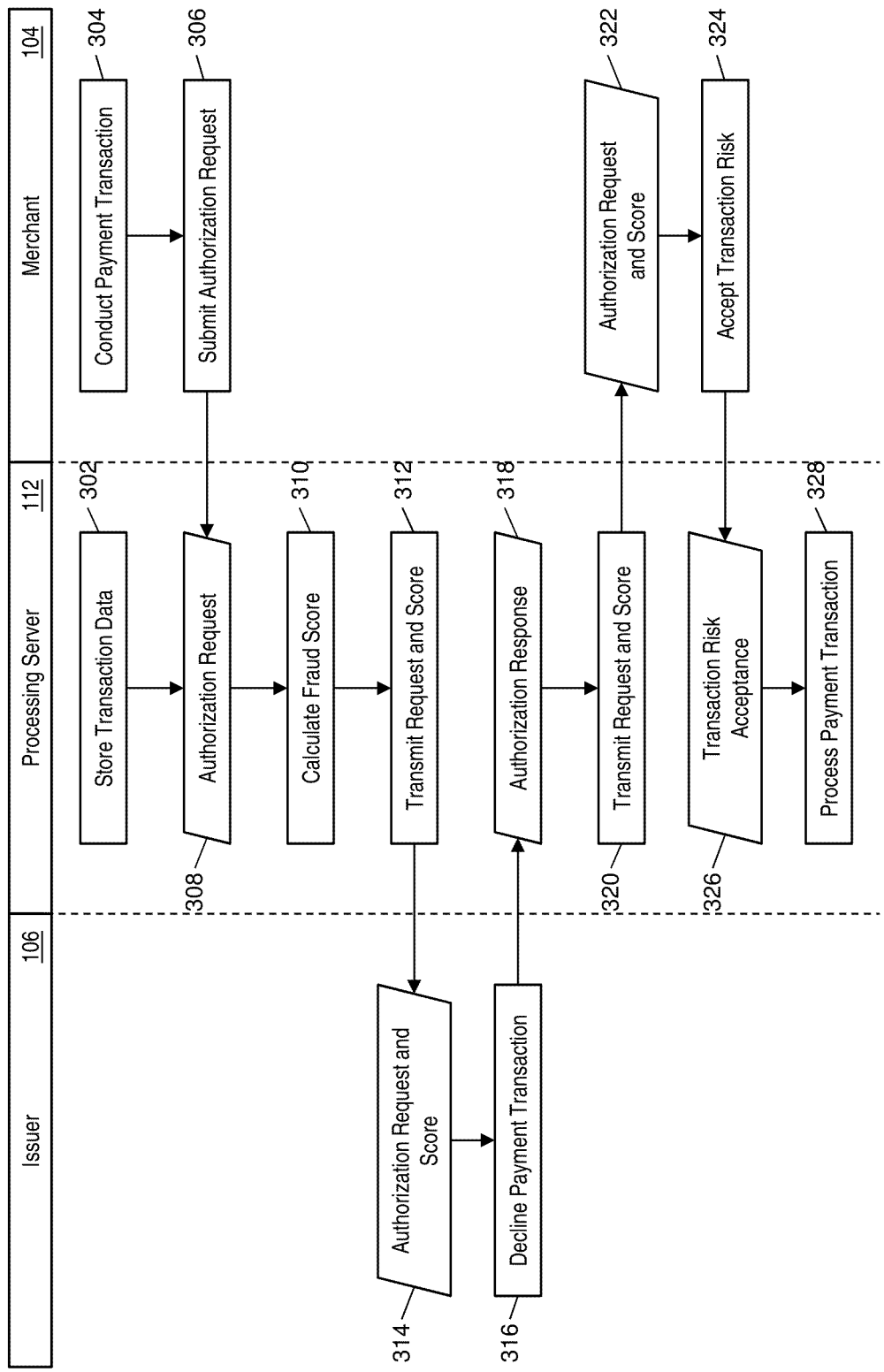
FIG. 3 is a flow diagram illustrating a process for processing a declined payment transaction as a result of merchant acceptance of risk in the system of FIG. 1 in accordance with exemplary embodiments.

FIG. 3 illustrates a process for the processing of payment transaction using merchant specific fraud detection where the merchant 104 can accept risk for a declined payment transaction based on the merchant specific fraud score.

In step 302, the processing server 112 may store transaction data in the merchant profiles 210 in the merchant database 208. The merchant database 208 may include at least a merchant profile 210 associated with the specific merchant 104, which may include transaction data for a plurality of payment transactions involving the merchant 104. In step 304, the merchant 104 may conduct a payment transaction with a consumer 102. In step 306, an authorization request for the payment transaction may be submitted by the merchant 104, or by an acquirer 110 associated with the merchant 104.

In step 308, the receiving unit 202 of the processing server 112 may receive the authorization request. The authorization request may include at least transaction data and a merchant identifier associated with the merchant 104. In step 310, the processing unit 204 of the processing server 112 may calculate a merchant specific fraud score for the payment transaction. The merchant specific fraud score may be based on application of merchant specific fraud rules (e.g., stored in the merchant profile 210 or memory 216) to the transaction data included in the authorization request. In another embodiment, the merchant specific fraud score may be calculated by application of a fraud scoring rule to the transaction data associated with the merchant 104 as included in the merchant profile 210.

In step 312, the transmitting unit 206 of the processing server 112 may forward the authorization request for the payment transaction with the calculated fraud score to the issuer 106. In step 314, the issuer 106 may receive the authorization request and the merchant specific fraud score. In step 316, the issuer 106 may decide to decline the payment transaction based on the merchant specific fraud score. In step 318, the receiving unit 202 of the processing server 112 may receive an authorization response provided by the issuer 106 that indicates that the payment transaction is denied by the issuer 106. In some instances, the authorization response may indicate that the transaction was denied because of the merchant specific fraud score.

In step 320, the transmitting unit 206 of the processing server 112 may transmit the authorization request back to the merchant 104 with the merchant specific fraud score included. In step 322, the merchant 104 may receive the merchant specific fraud score and, in step 324, may agree to accept the risk of the payment transaction. The risk acceptance may be provided to the processing server 112, and may be received by the receiving unit 202 in step 326. After the merchant 104 has accepted the risk for the payment transaction, then, in step 328, the processing unit 204 may proceed with processing the payment transaction using traditional methods and systems. In the event that the payment transaction is later found to be fraudulent, the merchant 104 may subsequently be held liable for any associated fees or costs as a result of their acceptance of the risk for the transaction.

Figure 4:
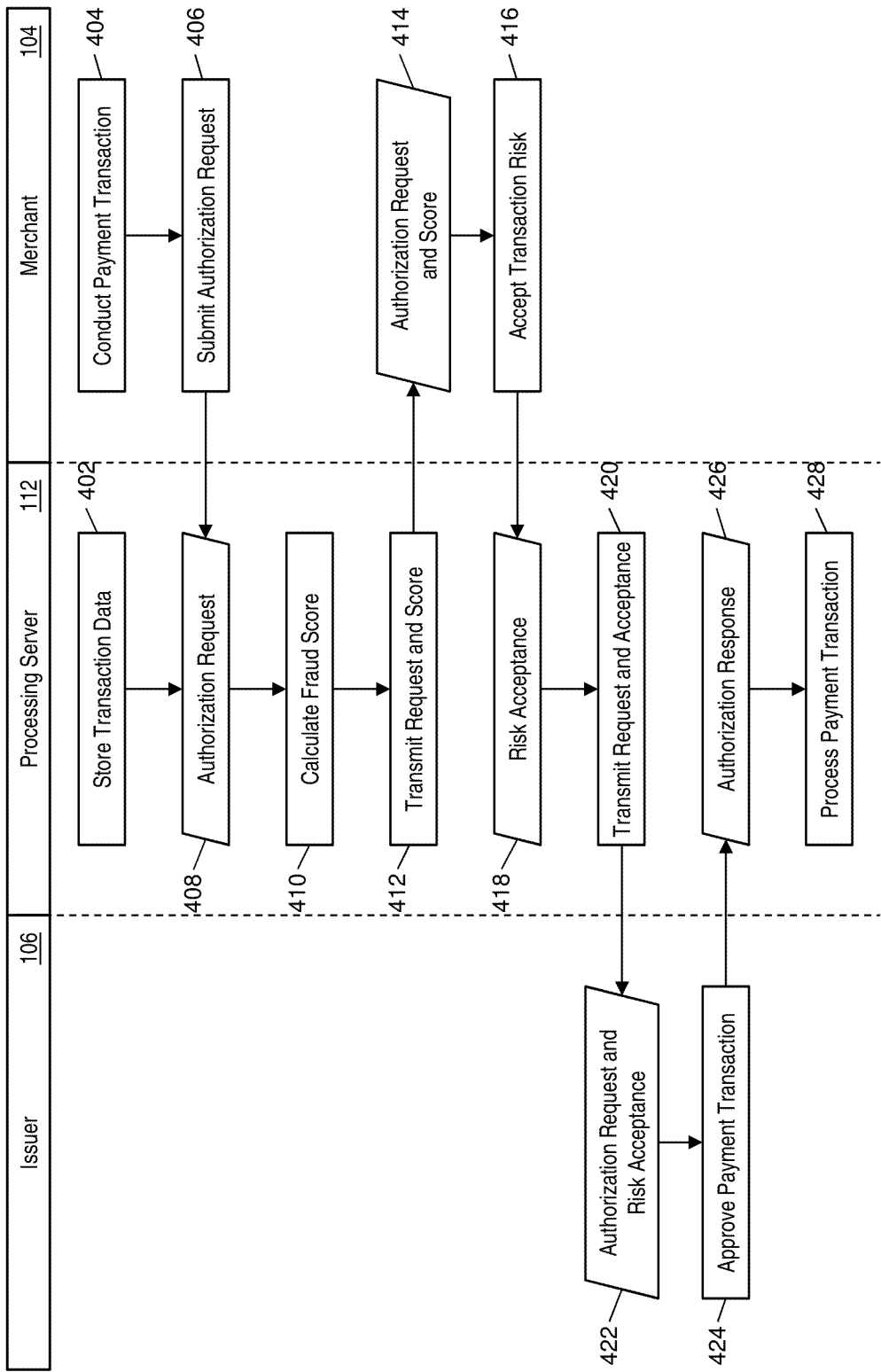
FIG. 4 is a flow diagram illustrating a process for processing a payment transaction approved via merchant acceptance of risk in the system of FIG. 1 in accordance with exemplary embodiments.

FIG. 4 illustrates an alternative process for the processing of a payment transaction with a merchant specific fraud score, where the merchant 104 may be provided the merchant specific fraud score for acceptance of risk prior to processing by the issuer 106.

In step 402, the processing server 112 may store transaction data in the merchant profiles 210 in the merchant database 208. The merchant database 208 may include at least a merchant profile 210 associated with the specific merchant 104, which may include transaction data for a plurality of payment transactions involving the merchant 104. In step 404, the merchant 104 may conduct a payment transaction with a consumer 102. In step 406, an authorization request for the payment transaction may be submitted by the merchant 104, or by an acquirer 110 associated with the merchant 104.

In step 408, the receiving unit 202 of the processing server 112 may receive the authorization request. The authorization request may include at least transaction data and a merchant identifier associated with the merchant 104. In step 410, the processing unit 204 of the processing server 112 may calculate a merchant specific fraud score for the payment transaction. The merchant specific fraud score may be based on application of merchant specific fraud rules (e.g., stored in the merchant profile 210 or memory 216) to the transaction data included in the authorization request. In another embodiment, the merchant specific fraud score may be calculated by application of a fraud scoring rule to the transaction data associated with the merchant 104 as included in the merchant profile 210.

In step 412, the transmitting unit 206 of the processing server 112 may transmit at least the merchant specific fraud score to the merchant 104. In step 414, the merchant 104 may receive the merchant specific fraud score. In some instances, the merchant specific fraud score may accompany the authorization request, such as may be transmitted to the merchant 104 in instances where the authorization request was originally generated and submitted by the acquirer 110. In step 416, the merchant 104 may decide, based on the merchant specific fraud score, to accept risk for the payment transaction if necessary. In step 418, the receiving unit 202 of the processing server 112 may receive the merchant's acceptance of risk.

In step 420, the transmitting unit 206 of the processing server 112 may transmit the authorization request and the merchant's acceptance of risk to the issuer 106 for processing. In some instances, the merchant specific fraud score may also be transmitted to the issuer 106. In step 422, the issuer 106 may receive the data, and, in step 422, may determine that the payment transaction is to be approved. In some instances, the transaction may be approved only because the merchant 104 has accepted risk, as a result of the merchant specific fraud score. As part of the approval of the payment transaction, the issuer 106 may submit an authorization response indicating approval of the payment transaction to the processing server 112.

In step 426, the receiving unit 202 of the processing server 112 may receive the authorization response. In some embodiments, the authorization response may indicate if the merchant 104 is liable for any charges associated with the payment transaction if it is found to be fraudulent. For example, if the issuer 106 would have normally approved the payment transaction, liability may be the same as in a standard processed transaction (e.g., based on an agreement with the issuer 106, etc.), but if the issuer 106 would have denied the transaction but for the merchant acceptance of the risk, then the authorization response may indicate that the merchant 104 is to be held liable. In step 428, the processing unit 204 of the processing server 112 may process the payment transaction accordingly using traditional methods and systems.

Merchant Specific Fraud Detection in Payment Transactions

Figure 5:
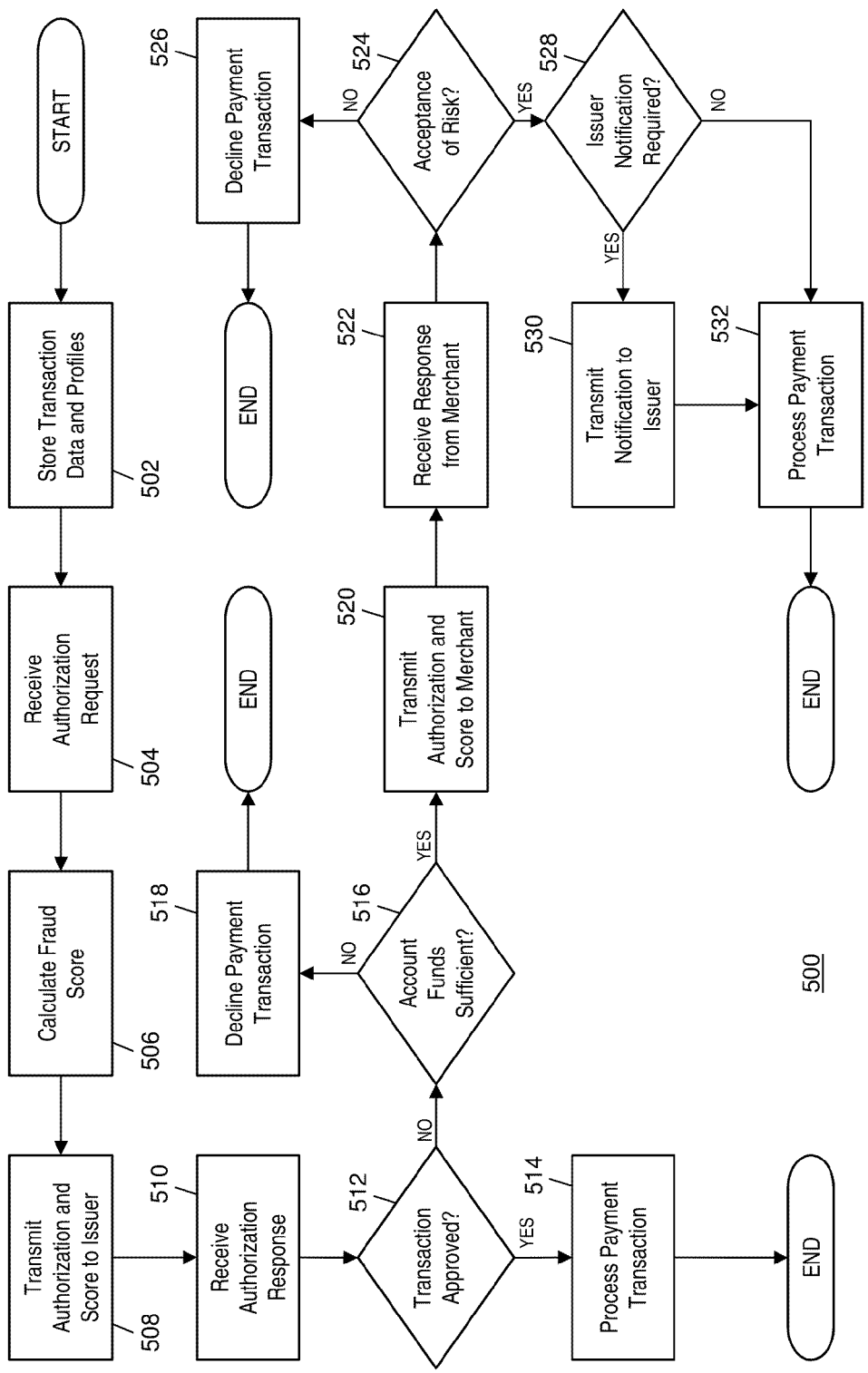
FIG. 5 is a flow diagram illustrating a process for processing payment transactions using a merchant specific fraud detection system using the processing server of FIG. 2 in accordance with exemplary embodiments.

FIG. 5 illustrates a process 500 for the processing of payment transactions by the processing server 112 using merchant specific fraud detection as discussed herein.

In step 502, the processing unit 204 of the processing server 112 may store transaction data and merchant data in merchant profiles 210 in the merchant database 208. In some embodiments, the processing unit 204 may also store transaction data and account data associated with consumers 102 in account profiles 214 in the account database 212. In step 504, the receiving unit 202 of the processing server 112 may receive an authorization request for a payment transaction. The authorization request may include at least a merchant identifier associated with a merchant 104 involved in the payment transaction and transaction data.

In step 506, the processing unit 204 may calculate a merchant specific fraud score for the payment transaction. Calculation of the merchant specific fraud score may include identifying a merchant profile 210 in the merchant database 208 that includes the merchant identifier included in the authorization request and calculating the merchant specific fraud score based on application of one or more scoring algorithms to the transaction data included therein. In some instances, the one or more scoring algorithms may be specific to the merchant 104, such as stored in the identified merchant profile 210. In some embodiments, the merchant specific fraud score may also be based on additional merchant data (e.g., stored in the merchant profile 210), consumer data associated with a consumer 102 involved in the payment transaction (e.g., stored in an associated account profile 214), and transaction data as included in the authorization request.

Once the merchant specific fraud score has been calculated, then, in step 508, the transmitting unit 206 of the processing server 112 may transmit the authorization request and the calculated merchant specific fraud score to the issuer 106 associated with the transaction account used to fund the payment transaction. The issuer 106 may be identified via data included in the authorization request, such as a bank identification number included in a transaction account number. In step 510, the receiving unit 202 may receive an authorization response from the issuer 106.

In step 512, the processing unit 204 may determine if the transaction was approved or denied by the issuer 106 as indicated in the received authorization response. If the processing unit 204 determines that the transaction was approved (e.g., as indicated in the authorization response), then, in step 514, the processing unit 204 may process the payment transaction as normal using traditional methods and systems. If the processing unit 204 determines that the transaction was not approved (e.g., the authorization response indicates denial), then, in step 516, the processing unit 204 may determine if the transaction account has sufficient funds and is otherwise able to support the payment transaction. The determination may be made based on data included in the authorization response or in accompanying data provided by the issuer 106 and received in step 510.

If the transaction account is not sufficient to still support the payment transaction, such as due to inadequate available funds, then, in step 518, the processing unit 204 may decline the payment transaction and process the declined transaction accordingly using traditional methods and systems. If the transaction account is sufficient, then, in step 520, the transmitting unit 206 may transmit the transaction data (e.g., in the authorization request) and the merchant specific fraud score to the merchant 104 involved in the payment transaction. In step 522, the receiving unit 202 may receive a response from the merchant 104.

In step 524, the processing unit 204 may analyze the response and determine if the merchant 104 has agreed to accept the risk that the payment transaction may be a fraudulent transaction. If the merchant 104 does not accept the risk, then, in step 526, the processing unit 204 may decline the transaction and process it accordingly using traditional methods and systems. If the merchant 104 accepts the risk for the transaction, then, in step 528, the processing unit 204 may determine if the issuer 106 needs to be notified. The determination may be made based on data provided by the issuer 106, policy of the payment network 108, data included in the merchant profile 210 associated with the merchant 104 or an account profile 214 associated with the consumer 102, or any other suitable source.

If the issuer 106 is required to be notified, then, in step 530, the transmitting unit 206 may transmit a notification to the issuer 106 that the merchant 104 is accepting risk for the payment transaction. Once the issuer 106 has been notified, or if no notification is required, then, in step 532, the processing unit 204 may process the payment transaction using the traditional methods and systems for transaction processing.

Figure 6:
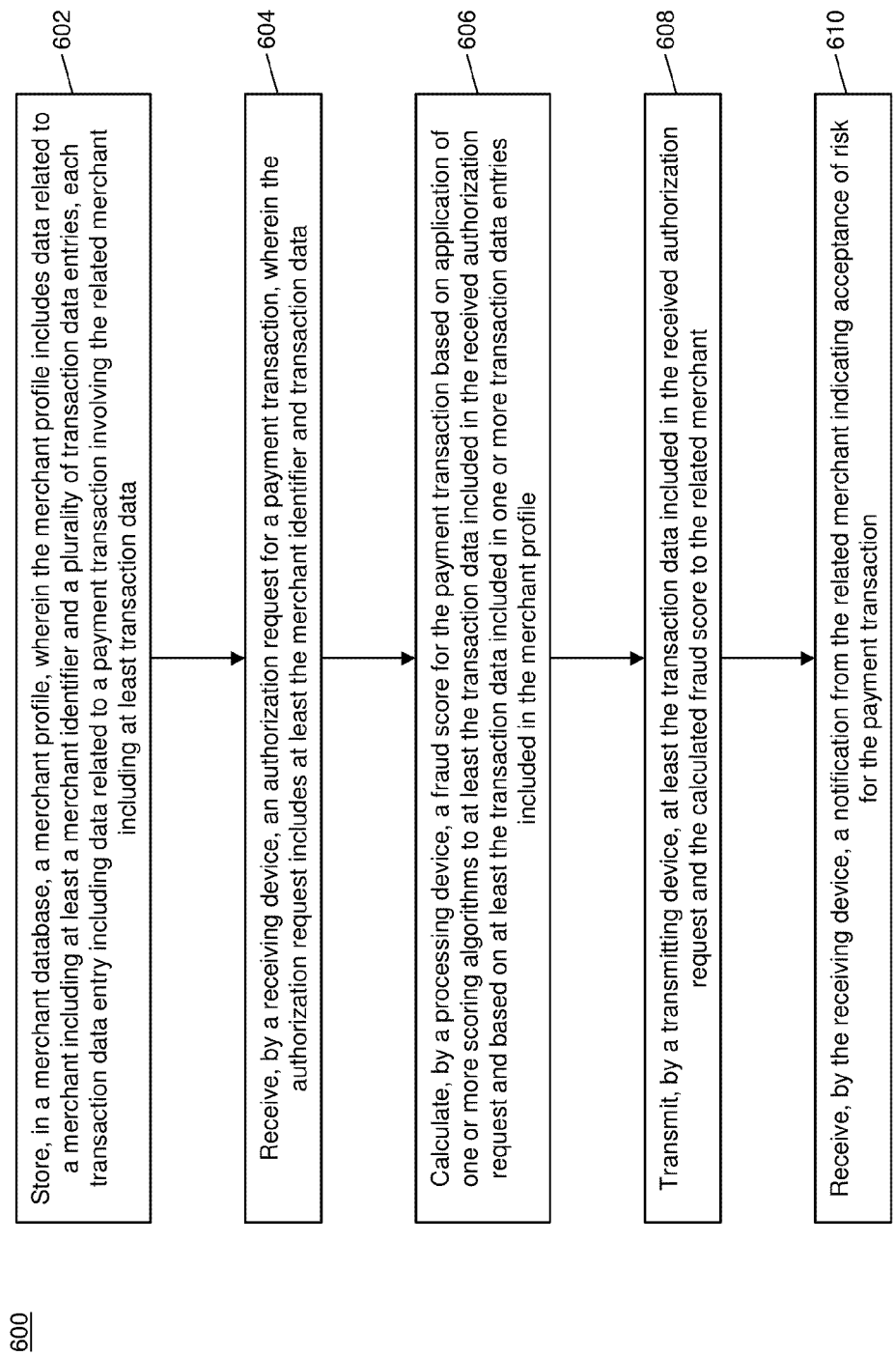
FIG. 6 is a flow chart illustrating an exemplary method for processing payment transactions with merchant specific fraud detection in accordance with exemplary embodiments.

Exemplary Method for Processing Payment Transactions with Merchant-Specific Fraud Detection FIG. 6 illustrates a method 600 for processing payment transactions utilizing a fraud score calculated for the transaction that is specific to a merchant involved in the payment transaction.

In step 602, a merchant profile (e.g., merchant profile 210) may be stored in a merchant database (e.g., the merchant database 208), wherein the merchant profile 210 may include data related to a merchant (e.g., the merchant 104) including at least a merchant identifier and a plurality of transaction data entries, each transaction data entry including data related to a payment transaction involving the related merchant 104 including at least transaction data. In some embodiments, the transaction data may include at least one of: transaction amount, transaction time and/or date, geographic location, shipping address, billing address, merchant data, consumer data, account data, device data, and point of sale data. In step 604, an authorization request for a payment transaction may be received by a receiving device (e.g., the receiving unit 202), wherein the authorization request includes at least the merchant identifier and transaction data.

In step 606, a fraud score may be calculated by a processing device (e.g., the processing unit 204) for the payment transaction based on application of one or more scoring algorithms to at least the transaction data included in the received authorization request and based on at least the transaction data included in one or more transaction data entries included in the merchant profile 210. In one embodiment, the one or more transaction data entries included in the merchant profile 210 may involve a transaction account involved in the payment transaction. In some embodiments, the one or more scoring algorithms may be associated with the related merchant 104.

In step 608, at least the transaction data included in the received authorization request and the calculated fraud score may be transmitted to the related merchant 104 by a transmitting device (e.g., the transmitting unit 206). In step 610, a notification may be received from the related merchant 104 by the receiving device 202 indicating acceptance of risk for the payment transaction.

In one embodiment, the method 600 may also include processing, by the processing device 204, the payment transaction. In some embodiments, the method 600 may further include transmitting, by the transmitting device 206, at least the authorization request and an indication of merchant acceptance of risk to an issuing financial institution (e.g., the issuer 106) associated with a transaction account involved in the payment transaction. In a further embodiment, the method 600 may even further include: receiving, by the receiving device 202, an authorization response indicating approval of the payment transaction based on the indication of merchant acceptance of risk; and processing, by the processing device 204, the payment transaction.

In one embodiment, the method 600 may also include: transmitting, by the transmitting device 206, at least the authorization request and calculated fraud score to an issuing financial institution 106 associated with a transaction account involved in the payment transaction; and receiving, by the receiving device 202, an authorization response indicating denial of the payment transaction based on at least the calculated fraud score, wherein the authorization response is received before transmitting the transaction data included in the received authorization request and calculated fraud score to the merchant 106. In a further embodiment, the authorization response may further include an indication of sufficient funds for the transaction account.

In some embodiments, the method 600 may further include storing, in an account database (e.g., the account database 212), an account profile (e.g., account profile 214), wherein the account profile 214 includes data related to a transaction account involved in the payment transaction including at least a plurality of transaction data entries, each transaction data entry including data related to a payment transaction involving the related transaction account including transaction data, wherein the calculated fraud score is further based on the transaction data included in one or more transaction data entries included in the account profile 214.

Computer System Architecture

Figure 7:
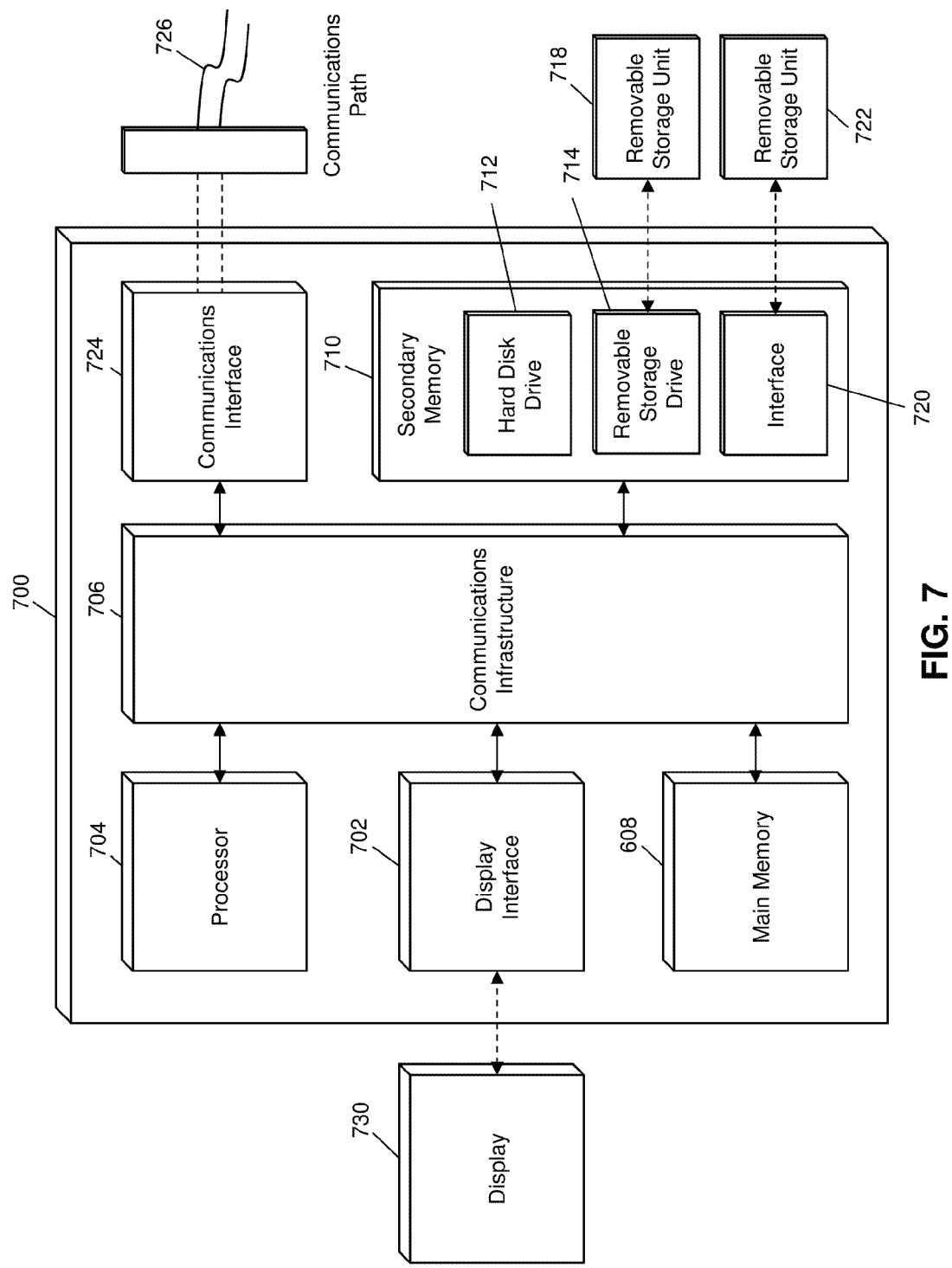
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-7, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for processing payment transactions using merchant specific fraud detection. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for electronically processing payment transactions with merchant-specific fraud detection, comprising:

storing, in a merchant database device of a processing server, a plurality of merchant profiles, wherein each merchant profile includes data related to a corresponding merchant including at least a merchant identifier and a plurality of merchant-specific transaction data entries, and wherein each transaction data entry includes data related to a payment transaction involving the corresponding merchant including at least transaction data;

receiving, by a receiving device of a processing server, an electronic authorization request for a payment transaction from a merchant computer system, wherein the electronic authorization request includes at least the merchant identifier associated with the merchant and transaction data;

calculating, by a processing device of the processing server, a fraud score for the payment transaction based on application of one or more merchant-specific scoring algorithms to at least the transaction data included in the received electronic authorization request, said one or more merchant-specific scoring algorithms being based on at least the transaction data included in one or more transaction data entries included in the merchant profile;

electronically transmitting, by a transmitting device of the processing server, at least the transaction data included in the received electronic authorization request and the calculated fraud score to the merchant computer system;

receiving, by the receiving device of the processing server, an electronic notification from the merchant computer system indicating acceptance of risk for the payment transaction, and transmitting, by the transmitting device of the processing server, at least the electronic authorization request and the indication of merchant acceptance of risk, received from the merchant computer system, to a computer system of a card-issuing financial institution associated with a financial account involved in the payment transaction with the merchant computer system, wherein said computer system of the card-issuing financial institution approves or denies the electronic authorization request.

2. The method of claim 1, further comprising:
processing, by the processing device of the processing server, the payment transaction.

3. The method of claim 1, further comprising:
receiving, by the receiving device of the processing server, an electronic authorization response from the computer system of the card-issuing financial institution indicating approval of the payment transaction based on the indication of merchant acceptance of risk; and
processing, by the processing device of the processing server, the payment transaction.

4. The method of claim 1, further comprising:
receiving, by the receiving device of the processing server, an electronic authorization response from the computer system of the card-issuing financial institution indicating denial of the payment transaction based on at least the calculated fraud score.

5. The method of claim 4, wherein the electronic authorization response further includes an indication of sufficient funds for the transaction account.

6. The method of claim 1, further comprising:
storing, in an account database device of the processing server, an account profile, wherein the account profile includes data related to a transaction account involved in the payment transaction including at least a plurality of transaction data entries, each transaction data entry including data related to a payment transaction involving the related transaction account including transaction data, wherein
the calculated fraud score is further based on the transaction data included in one or more transaction data entries included in the account profile.

7. The method of claim 1, wherein the one or more transaction data entries included in the merchant profile involve a transaction account involved in the payment transaction.

8. The method of claim 1, wherein transaction data includes at least one of: transaction amount, transaction time and/or date, geographic location, shipping address, billing address, merchant data, consumer data, account data, device data, and point of sale data.

9. An electronic system for processing payment transactions with merchant-specific fraud detection, comprising:
a merchant database device, of a processing server, configured to store a plurality of merchant profiles, wherein each merchant profile includes data related to a corresponding merchant including at least a merchant identifier and a plurality of merchant-specific transaction data entries, and wherein each transaction data entry includes data related to a payment transaction involving the corresponding merchant including at least transaction data;
a receiving device, of the processing server, configured to receive an electronic authorization request from a merchant computer system for a payment transaction, wherein the electronic authorization request includes at least the merchant identifier associated with the merchant and transaction data;
a processing device, of the processing server, configured to calculate a fraud score for the payment transaction based on application of one or more merchant-specific scoring algorithms to at least the transaction data included in the received electronic authorization request, said one or more merchant-specific scoring algorithms being based on at least the transaction data included in one or more transaction data entries included in the merchant profile; and
a transmitting device, of the processing server, configured to electronically transmit at least the transaction data included in the received electronic authorization request and the calculated fraud score to the merchant,
wherein the receiving device, of the processing server, is further configured to receive an electronic notification from the merchant computer system indicating acceptance of risk for the payment transaction, and
wherein the transmitting device, of the processing server, transmits at least the electronic authorization request and the indication of merchant acceptance of risk, received from the merchant computer system, to a computer system of a card-issuing financial institution associated with a financial account involved in the payment transaction with the merchant computer system, wherein said computer system of the card-issuing financial institution authorizes or denies the electronic authorization request.

10. The system of claim 9, wherein the processing device, of the processing server, is further configured to process the payment transaction.

11. The system of claim 9, wherein
the receiving device, of the processing server, is further configured to receive an electronic authorization response from the computer system of the card-issuing financial institution indicating approval of the payment transaction based on the indication of merchant acceptance of risk, and
the processing device, of the processing server, is further configured to process the payment transaction.

12. The system of claim 9, wherein
the receiving device, of the processing server, is further configured to receive an electronic authorization response from the computer system of the card-issuing financial institution indicating denial of the payment transaction based on at least the calculated fraud score.

13. The system of claim 12, wherein the electronic authorization response further includes an indication of sufficient funds for the transaction account.

14. The system of claim 9, further comprising:
an account database device of the processing server configured to store an account profile, wherein the account profile includes data related to a transaction account involved in the payment transaction including at least a plurality of transaction data entries, each transaction data entry including data related to a payment transaction involving the related transaction account including transaction data, wherein
the calculated fraud score is further based on the transaction data included in one or more transaction data entries included in the account profile.

15. The system of claim 9, wherein the one or more transaction data entries included in the merchant profile involve a transaction account involved in the payment transaction.

16. The system of claim 9, wherein transaction data includes at least one of: transaction amount, transaction time and/or date, geographic location, shipping address, billing address, merchant data, consumer data, account data, device data, and point of sale data.

* * * * *